United States Patent
Kaun et al.

(10) Patent No.: US 10,525,965 B2
(45) Date of Patent: Jan. 7, 2020

(54) METHOD FOR PREDICTING THE CONSUMPTION OF A MOTOR VEHICLE, MOTOR VEHICLE AND COMPUTER PROGRAM

(71) Applicant: AUDI AG, Ingolstadt (DE)

(72) Inventors: Markus Kaun, Ingolstadt (DE); Boris Blasinski, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 164 days.

(21) Appl. No.: 15/504,439

(22) PCT Filed: Jun. 30, 2015

(86) PCT No.: PCT/EP2015/001312
§ 371 (c)(1),
(2) Date: Feb. 16, 2017

(87) PCT Pub. No.: WO2016/026544
PCT Pub. Date: Feb. 25, 2016

(65) Prior Publication Data
US 2018/0222467 A1    Aug. 9, 2018

(30) Foreign Application Priority Data
Aug. 19, 2014  (DE) .................. 10 2014 012 318

(51) Int. Cl.
*B60W 20/12*   (2016.01)
*B60W 10/06*   (2006.01)
(Continued)

(52) U.S. Cl.
CPC ............ *B60W 20/12* (2016.01); *B60W 10/06* (2013.01); *B60W 10/08* (2013.01); *B60W 40/12* (2013.01);
(Continued)

(58) Field of Classification Search
None
See application file for complete search history.

(56) References Cited

U.S. PATENT DOCUMENTS

| 5,487,002 A | 1/1996 | Diller et al. |
| 8,116,973 B2 | 2/2012 | Soma et al. |

(Continued)

FOREIGN PATENT DOCUMENTS

| CN | 1748124 A | 3/2006 |
| CN | 101517361 A | 8/2009 |

(Continued)

OTHER PUBLICATIONS

German Office Action dated May 21, 2015 of corresponding application No. 10 2014 012 318.9; 6 pgs.

(Continued)

*Primary Examiner* — Thomas G Black
*Assistant Examiner* — Demetra R Smith-Stewart
(74) *Attorney, Agent, or Firm* — Maier & Maier, PLLC

(57) ABSTRACT

A method for calculating in advance the consumption of a motor vehicle provided with at least one drive motor in a drivetrain, wherein the power levels of differentiated predicted energies describing the predicted operation of the motor vehicle, which are required to complete a route that is known in advance and include input data obtained from the route data, are determined, wherein the predicted energies are assigned in dependence on the associated power levels and at least one used operating strategy proportionally to the different efficiency models of the drive train, and while using the efficiency model from the predicted energy components associated with the efficiency model, the energy used from an associated energy storage device is determined as consumption or as a variable determining consumption.

19 Claims, 5 Drawing Sheets

(51) Int. Cl.
*B60W 10/08* (2006.01)
*B60W 50/00* (2006.01)
*B60W 40/12* (2012.01)

(52) U.S. Cl.
CPC ... *B60W 50/0097* (2013.01); *B60W 2510/244* (2013.01); *B60W 2540/30* (2013.01); *B60W 2550/402* (2013.01); *B60W 2560/02* (2013.01); *Y02T 10/6286* (2013.01); *Y02T 10/84* (2013.01); *Y10S 903/93* (2013.01)

(56) References Cited

U.S. PATENT DOCUMENTS

| | | | | |
|---|---|---|---|---|
| 8,972,161 | B1* | 3/2015 | Koebler | G01C 21/3469 701/123 |
| 9,506,765 | B2* | 11/2016 | Stille | G01C 21/3469 |
| 9,702,718 | B2* | 7/2017 | Payne | G01C 21/3469 |
| 2011/0313647 | A1* | 12/2011 | Koebler | B60L 15/2045 701/123 |
| 2013/0073113 | A1 | 3/2013 | Wang | |
| 2015/0241310 | A1* | 8/2015 | Brown | G06F 17/18 702/179 |
| 2015/0275787 | A1* | 10/2015 | Dufford | F02D 29/02 701/102 |
| 2017/0038222 | A1* | 2/2017 | Meyer | G01C 21/26 |

FOREIGN PATENT DOCUMENTS

| | | |
|---|---|---|
| DE | 102012001740 A1 | 8/2013 |
| DE | 102013009945 A1 | 12/2013 |
| DE | 102013009276 A1 | 12/2014 |
| DE | 102013016569 A1 | 4/2015 |
| EP | 1270303 A2 | 1/2003 |
| EP | 2071285 A1 | 6/2009 |
| JP | 2004-248455 A | 9/2004 |
| WO | 2011128410 A1 | 10/2011 |

OTHER PUBLICATIONS

International Search Report dated Oct. 13, 2015 of corresponding application No. PCT/EP2015/001312; 10 pgs.
Notification of Transmittal of Translation of the International Preliminary Report on Patentability (Chapter I or Chapter II) dated Mar. 2, 2017, in connection with corresponding International Application No. PCT/EP2015/001312 (7 pgs.).
Chinese Office Action dated Aug. 28, 2018, in connection with corresponding CN Application No. 201580044736.1 (17 pgs., including English translation).
Office Action dated May 7, 2019 in connection with corresponding Chinese Application No. 201580044736.1, including English-language translation, 7 pages.
Chinese Office Action dated Sep. 30, 2019, in connection with corresponding CN Application No. 201580044736.1 (24 pgs., including machine-generated English translation).

* cited by examiner

METHOD FOR PREDICTING THE CONSUMPTION OF A MOTOR VEHICLE, MOTOR VEHICLE AND COMPUTER PROGRAM

BACKGROUND

The invention relates to a method for predicting the consumption of a motor vehicle, which is provided with at least one drive motor and one drivetrain, a motor vehicle and a computer program.

Motor vehicles can use different types of energy to cover a distance with the aid of drive motors. For example, it is known that there are motor vehicles that use only an internal combustion engine as a drive motor which generates energy by burning fuel in a fuel tank. Also known are hybrid vehicles, which are equipped in addition to an internal combustion engine also with an electromotor that is used as a another drive motor, and which can obtain the energy necessary for its operation from its battery. Also so called plug-in hybrids have already become known as hybrid motor vehicles, in which the battery of the electromotor can be charged through a compatible charging device at a corresponding charging station, or through a general power-supplying network.

It is desirable for a number of different reasons if it can be predicted when the route to be traveled is known in advance, for example from a navigation system, how high the consumption of the fuel or of the electrical energy of the motor vehicle will be. Such a consideration is relevant for instance when planning an overall operating strategy of a plug-in hybrid motor vehicle for a route that is known in advance, wherein the objective is usually to use all of the electric energy up to the end of the route in order to maximize the portion of the route that is powered electrically and thus also to maximize the consumption savings. However, this should be done in a way that makes sense from an economical and ecological viewpoint, since the total consumption of the hybrid drivetrain should be minimized. As an example, it is not an advantage when the vehicle is driven electrically on longer country roads of the route and then it must use the combustion engine in the subsequent city segment because the charge status of the battery is now too low. However, if the use of electric energy is in principle prohibited on segment of the route with country roads, there is the danger that too much electric energy will be left unused at the end of the trip in the battery.

In the context of determining an overall operating strategy for a route that is known in advance, the different operating modes of the hybrid drive system are taken into account for an optimization of the manner in which they are used, in particular when they are differentiated for different parts of the route. In order to determine the consumption for different operating strategies, the route data describing the routes that are known in advance are available, such as for example data indicating how the route is put together from the viewpoints of the city traffic, in particular in terms of environmental zones, country roads, highways and the like. It is known that already know portions of routes can be used in order to provide expected consumption, for example with the average consumption values indicated the last time for highway sections with no speed limit and the like. This means that that electric motor and the combustion engine motor consumptions are analyzed and averaged during the trip in order to make it possible to arrive at estimates of the consumption available for an evaluation of certain parts of a route that is known in advance.

Similar procedures are also known to be used when the consumption needs to be estimated for example for a calculation of the remaining range.

As was already mentioned, certain characteristics of the route sections are used to apply historical consumption values to the same characteristics of sections of the road already traveled. For example, a distinction can be made between traffic in the city, and on country roads and highways. At the same time, although already traveled sections of the route that have the same selected characteristics can be clearly differentiated from portions of a known route that have not been traveled yet, a clear residual inaccuracy will still remain for the determination of consumption. The result is that depending on the use, this can lead for example to operating strategies that are not optimal and/or provide inaccurate remaining ranges of the motor vehicle.

SUMMARY OF THE DISCLOSURE

The object of the invention is therefore to indicate a consumption calculation method, which does not require historical consumption values from already known sections of the route, and which at the same time provides an improved result with respect to the accuracy of the consumption.

In order to achieve this object with a method of the type mentioned in the introduction, input data are determined that comprise predicted energy described for differentiated power levels likely to be required to cope with a known route, which are predicted for the operations of the motor vehicle at least depending the power levels required on the wheels of the motor vehicle, comprising base data determined from route data, wherein the predicted energy is assigned proportionately to different efficiency models of the drivetrain according to the power level assigned with at least one used operating strategy to proportionately different efficiency models of the drive drain, and while using the efficiency model obtained from the efficiency model associated with predicative energy components by using also the energy consumption of at least one drive motor determined from an associated energy storage device for consumption and/or for the energy consumption determining variables.

The method according to the invention thus provides a predictive advance calculation, without referring back to the available consumption amounts measured in the past, so that the result of a wheel power prediction is used. The basis of the method according to the invention is therefore that it is possible to predict which powers and thus also energy amounts must be made available on the wheels of the motor vehicle in order to cover a known distance. For example, a performance profile can be determined in a manner that is per se known for the entire known distance. It can be therefore predicted which total predicted energy amount will be likely required to complete the distance on the track of the wheel, which can be for example also divided according to the corresponding powers required at the corresponding points along the track in the case of a performance profile also for corresponding performance levels along the to track, wherein it is preferred when a power distribution is used which ultimately indicates how strongly certain power intervals contribute to the entire predicted energy. In this preferred, last-mentioned case, a kind of a histogram is therefore produced, in which it is differentiated which component creates a predicted energy with which power on the wheels of the motor vehicle.

However, to make it possible to deduce the energy from this, it must be determined how much power must be generated by at least one drive motor and how much energy will be withdrawn for this purpose from the corresponding energy storage device, since it is known that certain efficiency standards are present in the drivetrain, which prevent that the entire corresponding energy storage device, for example a battery and/or a fuel tank, would make the initial energy available also as energy provided on the wheels. In other words, it must be possible to provide an opportunity to come to a conclusion about the differentiated predicted energy that will be required for this purpose as the initial energy depending on the power. This is done within the scope of the invention by using the efficiency models mentioned above. The efficiency models in a drivetrain depend in this case not only on the load point, which is directly connected with the required power, but sometime they depend also on operation parameters of the drivetrain, which can be influenced by the operating strategy that is used. The power levels, according to which predicted energy levels are differentiated, thus provide indications about the present load points, since different efficiency levels are obtained for many drivetrain types with different efficiencies of the components of the drivetrain, so that for example a characteristic curve and/or a characteristic diagram are provided for continuously obtained power levels, or a lookup table can be made available with power intervals as an efficiency model.

However, the operating strategy can be also essential, in particular when certain operating modes having differing operating parameters are defined by the operating strategy for different parts of the route. For example, in a hybrid motor vehicle may be provided operating modes in which only the electromotor is operated, or operating modes in which only the internal combustion engine is operated, wherein the charging capacity of the battery of the electromotor can be obtained in another operating mode from the internal combustion engine, etc. However, the operating parameters according to which the drivetrain is operated can have an influence on the efficiency level in the drivetrain also with other types of motor vehicles. An operating strategy can thus be for example described, in which operating parameters are available, in particular as to which operating mode is provided along a certain part of the route, so that the correct efficiency model can be provided for this part of the route.

The efficiency level is therefore made available through the efficiency model for certain power levels and/or for operating parameters of the drivetrain in the drivetrain, which make it possible to recalculate the energy amounts (wheel energies) required from the energy storage devices for the input of energies on the wheels of the vehicle. Moreover, after the predicted energy has been differentiated depending on the power levels, it can be indicated which load points are presumably present, so that the corresponding efficiency model will be provided for the corresponding predicted energy components.

At the same time, it should be at this point emphasized that the power levels can also have an influence on the operating parameters of the drivetrain of the motor vehicle, when for example the power levels of certain operating modes, which is to say certain operating parameters, are set for the operating strategy depending on the used operating strategy, for instance so that only lower power levels are used with a hybrid motor vehicle, which is usually described by the limit used for turning on and/or turning off the internal combustion engine.

Advanced operating strategies are in this case often indicated for a total operating strategy, which can also contain partial operating strategies for different portions of the route reacting differently to differently required power levels. Therefore, the allocation of the predicted energy components can be also dependent on a currently used portion of a previously known route. In other words, a partial determination of the consumption along the route is possible, wherein different partial operating strategies are applied to different portions of the route that may have an influence on the present operating parameters/operating modes with determined power levels, and thus also on the allocation of the predicted energy components of the efficiency models.

At the same time, it should be also mentioned at this point that efficiency models are already known from prior art, according to which, however, in order to determine the efficiency level, the precise operational state of the drivetrain must be known for points in time on the route being covered. For example, the torque and the rotational speed of the internal combustion engine must be known in order to determine the load point and thus the efficiency level. This would require extremely complex calculations, which would in addition presumably result in inaccuracies. The present method, on the other hand, relates to the use of the prediction of wheel power, so that according to a preferred embodiment, only the total energy required for the portions of the route (or for the entire route) are differentiated according to the power levels as input variables, so that the so-called transient variables are no longer needed. Complex calculations are therefore not necessary. Although a much lower computing power is required, a much more precise prediction of the consumption is enabled when compared to the approaches based on history.

The efficiency models can in this case be determined for example by means of simulation and/or measurements. For example, efficiency level regions can be determined that are representative of the power output based on the predicted wheel power or power output intervals. This can be carried out for different operating parameters/operating modes of the drivetrain, so that it is ultimately possible to provide settings for combination of power levels and for operating parameters/operating modes of the efficiency levels of the drivetrain to make available efficiency models, which make it possible to calculate the consumption for the corresponding predicted energy components.

In other words, the efficiency model that is selected for a predicted energy component can be understood as a record of data reflecting the efficiency levels in the drive train, which makes it possible to come to a conclusion about the required input energy levels based on the power required on the wheels of the vehicle.

As was already indicated, the consumption levels can be used for different applications. It is thus possible to provide consumption levels for different operating strategies determined for the same route/and or the same portions of the route, while taking into account an evaluation of the operating strategy, in particular in the context of the determination of the entire strategy for the entire route. It is also conceivable to integrate the calculation of consumption into a method for determination of suitable operating strategies, in which the consumption levels are ultimately used to evaluate different possible operating strategies, or, if appropriate, evaluate the levels applied to portions of the road so that the consumption relevant to a plurality of optimization goals can be found for a determination of an overall operating strategy for the route, for example while aiming at the lowest possible consumption. A determination of consumption that is as accurate as possible is indispensable in particular in the case of hybrid vehicles when the consumption of a fuel for the internal combustion engine should be kept as low as possible, while at the same time the battery supplying the stored energy to the electromotor should be discharged as much as possible. The process according to the invention thus provides in this case an excellent opportunity to obtain extremely accurate consumption levels without the risk of being affected by inaccurate historical data. In particular, it is for example possible to create prioritization for purely electric driving and/or for charging of the battery from the internal combustion engine also for the portions of the route with the same type of components when the prediction of the power at wheels represents different distribution of power levels. The result is that this makes it possible to achieve a better differentiation and a more precise prioritization of certain operating modes, for example to use purely electric driving also for different portions of the route that have many identical characteristics, so that the driving experience is improved in particular when a hybrid motor vehicle is used, and the consumption is reduced as much as possible, while comprehensive discharging of the battery of a hybrid motor vehicle is also realized. However, it is also possible to use the consumption levels to determine a remaining range, in particular a range in which different portions of the route are differentiated. A more accurate remaining range calculation can be also realized according to the method of the invention so that in particular with differentiated consumption levels for different portions of the route and a corresponding rendering of this information to the user of the motor vehicle, the comprehensibility of the relationship between the characteristics of the portions (traffic lights, slope, etc.) and changes in the remaining range can be improved.

As was already mentioned, the method according to the invention can be applied particularly advantageously to hybrid motor vehicles, wherein the motor vehicle may be a hybrid motor vehicle with an electromotor supplied by a battery and an internal combustion engine provided in a hybrid drivetrain, so that at least one operating strategy can be used while different power levels can be obtained with the use of different operating modes, which are determined for different efficiency levels for the allocation of predicted energy components. As an operating mode of the drivetrain can be in this case used for example the operation of the electromotor alone and/or the single operation of the internal combustion engine without charging of the battery supplying the electromotor from the internal combustion engine and/or a single operation of the internal combustion engine with charging of the battery supplying the electromotor from the internal combustion engine and/or maximum power operation of the internal combustion motor with additional power provided by the electromotor.

Depending on the combination of these operating modes, created for example by adapting the start and/switch-off limits for the internal combustion engine, an assigned distribution of predetermined power levels can be obtained, for example for the components of the predicted energy for certain power intervals, because certain operating modes will be activated on the wheels with certain required power levels. The predicted energy can be then understood as a kind of an "energy pot", so that depending on the power levels at which the corresponding components of the energy are used, distribution is created for different operating modes, which are described with clearly defined operating parameters, which means that a corresponding efficiency model can be also selected.

Different operating strategies are in this case conceivable, for example an operating strategy for maintaining the state of the charge of the battery supplying energy to the electromotor and/or a strategy for using a certain amount of the charging energy of the battery and/or an operating strategy matching prioritizing of operating modes and/or an operating strategy permitting only the operation of the electromotor and/or an operating strategy that maximizes the use of the electromotor. A number of other operating strategies are also conceivable, from which it is possible to deduce which components of the predicted energy will be omitted during which operating mode. It should be also noted that, obviously, as was already described above, it is also conceivable that the route could be divided into portions, for example segments, and different operating strategies could be defined for individual portions, through which the entire strategy would then be defined. This is convenient when a power level of differentiated predicted energy is provided for all of these portions, for example segments, which will be discussed in more detail below.

As was already mentioned, with the efficiency model are usually defined sets of efficiency levels for different components of the drivetrain. In the case of hybrid motor vehicles, this can mean that in the efficiency model are used efficiency levels for a transmission of the hybrid drivetrain, for the electromotor, for the internal combustion engine and for the battery, wherein an efficiency chain is determined depending on the drive engine that is used for determining the required energy for the prediction component and applied to the predicted energy component. If for example only the electromotor is used in an operating mode, the resulting efficiency chain will include the transmission, the electromotor, and the battery. If only the internal combustion engine is operated, the relevant efficiency chain will include the transmission, the electromotor, and the drive motor. At the same time, it should be noted that it is assumed that consumption characteristics are known for the internal combustion engine and therefore the power required from the associated consumption of the internal combustion engine is also known, for example from a stored characteristic curve, so that the energy required from the internal combustion engine itself and also the consumption of fuel from a fuel tank can be also obtained.

It goes without saying that these embodiments can be correspondingly transferred to a motor vehicle which uses for example an internal combustion engine as a drive motor, wherein the efficiency chain usually consists only of the transmission and the internal combustion engine, as far as the drive of the motor vehicle is concerned. Also in this case, it is naturally true that for example a characteristic curve or the like can be input in advance, which represent a determination of the consumption of fuel for motor vehicle for the internal combustion engine with the required power levels/energy levels.

According to one advantageous embodiment of this invention, at least one additional information item relating to the route and/or to the considered portion of the route is taken into consideration during the allocation of the predicted energy portions to the efficiency model, in particular the type of the road and/or traffic data describing the traffic situation and/or driving data describing the driving conduct of the driver. It is therefore also possible to differentiate the efficiency models even further by taking into account in particular already available information about the route, which is to say the road data, for example the type of the road and/or information about the traffic situation, in particular traffic jam.

Further information regarding the route, in particular portions of the route, includes the presence of environmental zones, the presence of climbing sections and/or of downhill sections and the like. It is also conceivable that weather conditions that can be described by weather data can have an influence on the efficiency levels so that a differentiation can be created also in this respect; finally, the behavior of the driver, which is described by the data, can also have an influence. These influences can be also reflected in the efficiency model, so that for example instead of providing them as direct numerical value for all efficiency levels, they can be read out as characteristic curves/characteristic diagrams by using additional information, wherein the additional information, however, can be also included in the allocation of the components of the predicted energy, such that the efficiency levels are in this case understood as different efficiency levels for different additional information.

As was already mentioned, a performance curve can already provide usable basic data for the determination of the expected consumption in accordance with the invention along the entire route. However, it is particularly advantageous when this amount of data is significantly reduced in a simple manner with further processing, wherein the allocation to the efficiency levels is thus clearly simplified. In this context, according to a preferred embodiment of the present invention, the predicted energy, differentiated according to the power that is required on the wheels of the motor vehicle to complete a known distance, is determined on the basis of the route data calculated for the performance curve for the entire route, in particular for a plurality of successive route sections. Specifically, the route can be in this case subdivided into route sections to which performance information identifying the route sections is assigned and the successive route sections are then combined in a common segment when at least one similarity criterion is met for the performance information pertaining to the route sections, so that each segment is determined according to the performance levels of the associated route sections.

A similar approach is described in German patent application filed in parallel to this application provided with the internal number P12040 of the applicant. It is proposed to first determine a performance profile along a route that is known in advance in a manner that is in principle known from prior art, while taking into account the route data and if necessary, to determine other input data. However, to simplify the following calculations while maintaining as large proportion of the information relating to the performance profile as possible, the data is divided into individual, disjointed segments in which the performance profile is evaluated for respective route section on the basis of the performance information. Contrary to what is known from prior art, the route data or map data of a digital map is not used to create a division of the route, for example according to a highway, country road or the like. Instead, the anticipated route is subdivided based on the power or performance profile into suitable segments with physically similar driving characteristics. For this purpose, the performance information of adjacent route sections, which can have for example the same length, for example three kilometers, are compared, wherein the power distribution within the components of actually used performances is considered based on the total required energy. Similarity criteria which evaluate this comparison make it possible to determine whether the route segments are allocated to the same segment and whether a segment separation is present between the sections of the route. When two or more segments are then combined into segments, the overall performance information can be easily obtained by combining the performance information of the individual route segments, in particular when these are related to power distribution levels. This makes it possible to create a subdivision of the route into segments based on a performance prediction, wherein the essential information is maintained in the individual segments differentiated according to the predicted energy for performance levels.

In order to determine the performance profile, additional data can be also taken into account, in particular driving data describing the driving behavior of the driver and/or traffic data and/or the traffic situation along the route with the descriptive traffic data. This means that the route is also divided into segments in dependence also on this additional data, which influences from the onset also the other calculation procedures and thus enables a better distribution of the route into segments.

According to a particularly preferred embodiment of the present invention, the power information and the predicted energy differentiated according to the performance levels for a segment are determined as a histogram describing the distribution of the predicted energy over at least two power intervals. Consequently, it is then known also for the route section and as prediction energy also for the segments which energy amounts will be required for the power from different power intervals, so that ultimately, the load point required along the route are then also better known. In this case it is obviously necessary to take into account also negative power levels, which can be used for recuperation, such as charging of the battery and the like. For example a distribution into intervals of 40 kWh is conceivable, such that when the energy that is in fact required in the power intervals is plotted against these power intervals, a histogram is created that describes the power distribution. By specifying the total required power amount (energy) in the power intervals, the exact size is made available, which can be evaluated in a simple manner in accordance with the invention in order to determine the consumption levels. In addition, similar histograms provide an ideal basis for a comparison, which is carried out within the context of the evaluation of at least one similarity criterion. In order to determine predicted energy differentiated according to the power levels, a simple combination of the histograms for segment sections is sufficient.

This similarity criterion can evaluate statistical variables, which are contained in the performance information and/or derived from it. This is particularly suitable when a histogram is used, (which is in any case a type of statistical evaluation) that describes the power distribution on the power intervals. In this case, it is possible to use as variables for example an average power on the route section and/or a maximum power on the route section and/or enveloping power of the histogram relating to the power levels. The form of the histogram, the upper limit of the histogram, as well as the average power can be in this case considered as useful indications as to whether the route sections are sufficiently similar to correspond to the same conduct and thus to be assigned to the same segment. For example, a maximum deviation from the average power can be defined as a similarity criterion, wherein it is very useful when the maximum power on the route section is being considered. Certain power intervals of do not occur under certain circumstances at all, for example high power peaks in a 30-mile zone or the like. A similarity criterion can be also created in such a way that when a certain maximum power level is not exceeded in the previous route section, this should also apply to the following section and the like. Finally, the form of the histogram, which is to say the actual distribution of the power levels, can provide a clear indication of a similar driving behavior in both route sections, so that the corresponding statistical variables describing the histogram can then be evaluated.

According to a particularly advantageous embodiment of this invention, the calculation of the consumption takes into account also additional predicted energy levels required for other motor vehicle systems, in particular for an air conditioning device. It often happens that certain consumers in a motor vehicle that are not used directly to cover a previously known route are also supplied from energies which are created at least by one drive motor and/or so that further consumption of fuel and/or electric energy occurs, which can be also taken into account for the calculation within the context of the present invention. Systems have been already proposed that can calculate in advance the power or energy requirements, so that corresponding variables are then available in this respect. Through corresponding efficiency level chains, which can be supported by particular models, it is possible to determine also in this case how much energy will be initially required by at least one motor in order to make the corresponding power levels available for the secondary users. The calculation of the consumption, which can be realized in this manner in accordance with the invention, is thus even more precise as it takes into account also further influences in addition to the actual driving operation.

In addition to the method, the present invention relates also to a motor vehicle that is provided with a control device designed for carrying out the method according to the invention. This device can be for example assigned to displaying the remaining range and/or to determination and carrying out an operating strategy. All embodiments regarding the method according to the invention can be analogously transferred to the motor vehicle according to the invention, so that the same advantages can be obtained with it.

Finally, the invention also relates to a computer program that carries out the steps of the method according to the invention. The computer device can be for example an already known control device of the motor vehicle. The computer program can be stored for example on a non-transient data carrier, for instance a CD-ROM. The previous embodiment can be applied analogously also to the computer program.

BRIEF DESCRIPTION OF THE DRAWINGS

Further advantages and details of the present invention are obtained from the embodiments described below as shown in the drawings, which show the following:

FIG. 5 predicted energy differentiated for a second segment according to power levels, FIG. 6 the distribution of predicted energy for a first operating strategy, FIG. 7 the distribution of predicted energy for a second operating strategy, FIG. 8 the distribution of predicted energy for a third operating strategy, FIG. 9 a schematic representation of a hybrid drivetrain with efficiency chains, FIG. 10 the process of the charging state of a battery of an electromotor for a route, and FIG. 11 a motor vehicle according to the invention.

An embodiment according to the invention will now be described in the context of the determination of an operating strategy for a hybrid motor vehicle will now be described, wherein the method for calculating consumption can be employed also for other applications, for example for a calculation of the remaining range and the like. A hybrid motor vehicle comprises a hybrid drivetrain, a transmission, an electromotor and an internal combustion engine, wherein a battery is used as an electromotor. The hybrid drivetrain can be operated with different operating parameters and therefore also in different operating modes; in the present case the operations are carried out by driving only with an electromotor, driving only with the internal combustion engine, driving with the internal combustion engine while charging the battery at the same time from the internal combustion engine, as well as by operating the internal combustion engine at the maximum power level and generating additional power with the electromotor in order to achieve a high performance.

When and how the hybrid drivetrain is deployed and in which operating mode is determined by an operating strategy. In this case, the operating strategy is defined by certain limits for starting and switching off the internal combustion engine and/or the electromotor as the drive motor, wherein strategic parameters for other operating strategies are of course also conceivable. While the motor vehicle drives through a route from the starting location to the location of a destination, an overall strategy can be defined for certain portions of the route with different partial operating strategies, which means that the parameters of the strategy can be changed along the route within the context of the overall operating strategy.

DETAILED DESCRIPTION OF THE DRAWINGS

Figure 1:
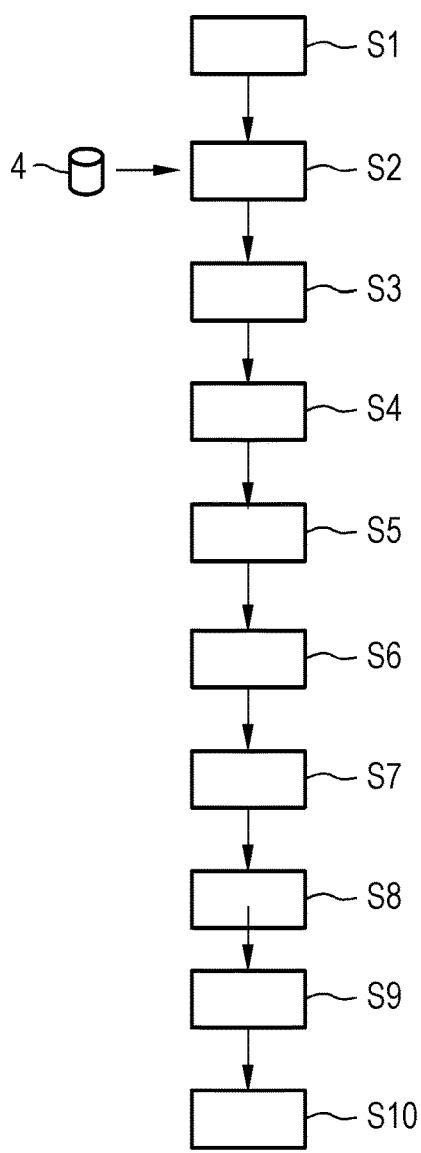
FIG. 1 a flowchart of an embodiment of the method according to the invention.

The following method, which is explained with reference to FIG. 1, is used to determine and carry out an operating strategy for a route that is known in advance and that will be described with route data. A part of this method for operating a motor vehicle is an embodiment of the method according to this invention.

Figure 2:
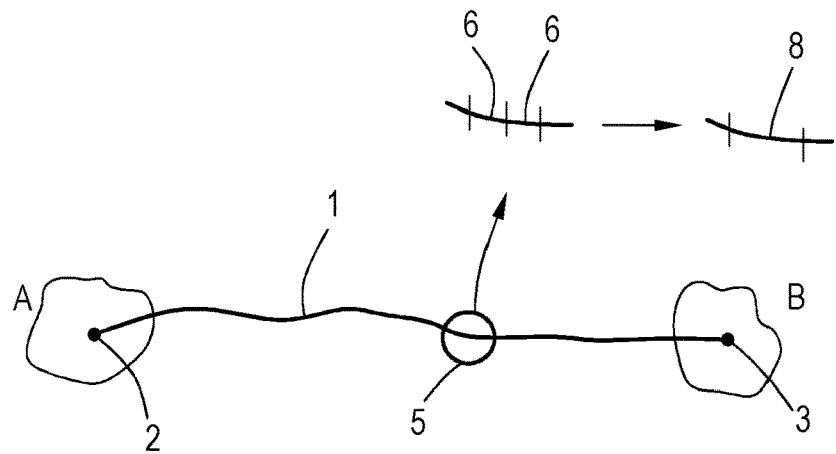
FIG. 2 a route to be covered, known in advance

In a step S1, route data to be described is made available for a route that is known in advance, in particular for a route from the navigation system of the motor vehicle that a hybrid vehicle is to travel on. FIG. 2 shows by way of an example such a previously known route 1, which leads from a starting point 2 in a location A to a destination location 3 in a location B and thus passes through different types of roads, for example when it begins in a residential area, follows main streets in the location A, then leads through a country road to a highway, along which it passes through sections with speed restrictions as well as through hilly sections or sections without hills. In location B it traverses again main streets and then it passes through residential areas to end at the destination location 3.

In a step S2, see again FIG. 1, the performance along the route is determined so that it is indicated how much power is to be applied by the motor vehicle to its wheels (wheel power), to make it possible to cope with the route 1. At the same time, negative power levels can be of course also obtained, for example when driving down the hill or when braking. These negative power levels can be also used to charge the battery. In this determination of the performance profile are also included additional data 4, which in the present case include driver data, weather data and traffic data. The driver data describe the driving behavior of the driver, the weather data describe the current weather along the route 1 and the traffic data described the traffic situation, in particular the traffic flow along the route 1. An improved prediction of the performance profile is thus enabled.

In a step S3, the route 1 is divided into route sections, which is to say components that in the present case all have the length of 3 km. This is shown schematically in the enlarged area 5 of the route 1 in FIG. 2 for sequential route sections 6. However, it should be pointed out that exceptions from these regular subdivisions can be also determined on the basis of criteria for exceptions, for example when it is clear from the route data, or from map data of a digital map, that there are clearly different relationships in one component of the route 1, which is shorter than 3 km, for example in a 30-mile zone. The length of such a route section can then be also adjusted.

Figure 3:
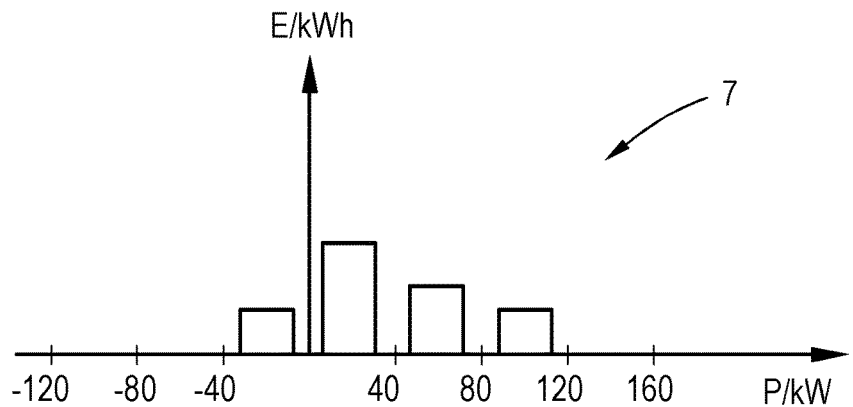
FIG. 3 power level information for a section of the route.

In a step S4, one power level information item is determined for the entire route 1 for each route section. This performance or power level information determines in the form of a histogram at what strength which power level intervals will contribute to the energy required for the entire route section 6. An example of such power level information 7 is shown in FIG. 3, in which the energy is plotted against the power level in different power level intervals, each of which is in the present case 40 kW. The power level information shown in FIG. 3 relates to a route section of a residential area, so that generally lower power levels will dominate here. This means that the average power level is low, only few power levels are present, and also the maximum power level is rather low.

The power level information 7 thus ultimately represents a power distribution created while dealing with the respective route sections 6, and it thus simplifies the performance profile in step S2, while it preserves the essential information. The power level information 7 can be also considered as energy predicted for the route section 6 according to the power levels required on the wheels.

The power level information 7 of the different route sections 6 are then used in a step S5 in order to determine whether sequential route sections belong or do not belong to the same segment. For this purpose, similarity criteria are considered, which are based on a comparison of the power level information 7 for the adjacent route sections 6, wherein in the present case the average power levels may not mutually strongly deviate and similar maximum power levels should be present. Further, the envelope of the histogram is considered to be its form. Depending on the concrete embodiment of the similarity criteria, it can be sufficient when one similarity criterion is met, or when several criteria must be met, or when all criteria must be met. If a similarity exists, the conclusion is that due to the similarity of the power level information, there is also a similar driving behavior and the consequent route sections 6 will be assigned to the same segment, as is schematically indicated by segment 8 in the example shown in FIG. 2. If there is no similarity, a new segment 8 is started after the following route section 6, after successively driving through the route sections.

The parts of the short route section 6 are thus combined in this manner into a longer segment 8.

The predicted energy is determined for these segments 8 in a step S6 on the basis of the power levels required on the wheels of the motor vehicle to travel the distance of the segment 8 with differentiated predicted energy, determined as the total power level information, which is in the present case obtained with a simple summation of the individual histograms. The predicted energy levels of the predicted energy differentiated for the individual segments 8 then determine also the predicted energy for the entire route 1, known in advance, wherein a summation of the histogram can be also carried out. In the present case, a more precise distribution of the predicted energy for the segments 8, which is known, has been proven more advantageous because during the following operations, a separate segment operating strategy should be determined for each segment 8 as a partial operating strategy for the route 1. This means that it should be determined for each of the segments which segment operating strategy is optimal for driving through the segment, so that for example a value can be assigned to the individual operating strategies. This makes it possible to achieve the consequent optimization with regard to optimization targets for the entire route 1.

Figure 4:
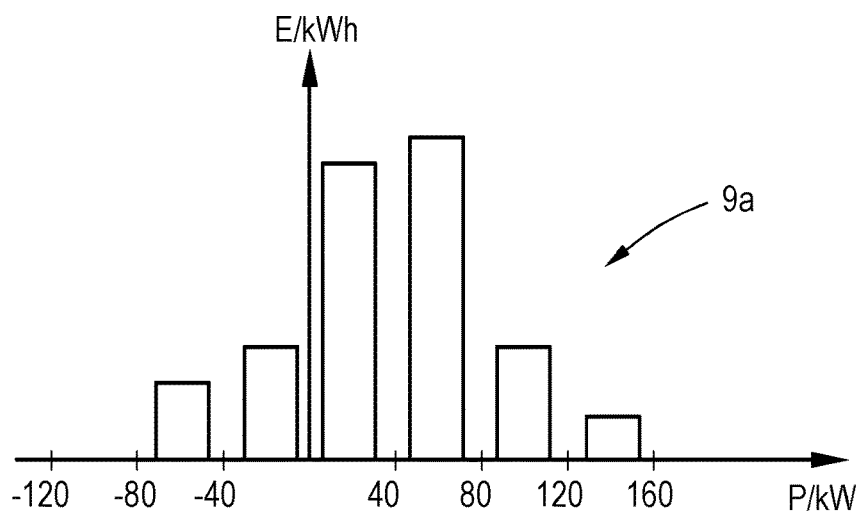
FIG. 4 predicted energy differentiated for a first section of the route.
Figure 5:
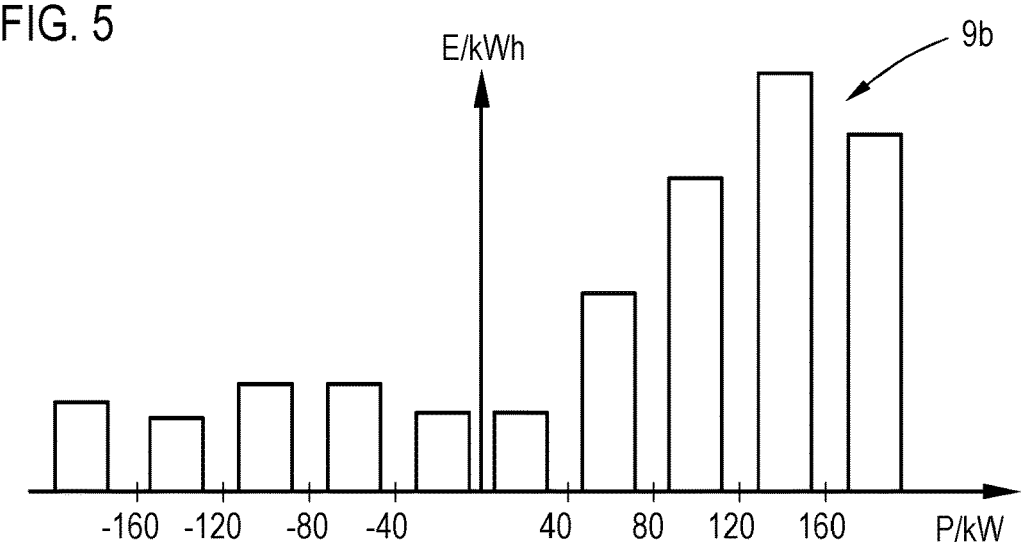
FIG. 5 predicted energy differentiated for a second segment.

FIGS. 4 and 5 show the average total power level information for segments 8, which is to say predicted energy histograms. FIG. 4 shows the total power level information 9a, which can be created for a highway that has speed limits. It is evident that a medium-high average power level is obtained, with hardly any major deviations. FIG. 5 shows total power level information 9b, which can be created on a highway without a speed limit when the motor vehicle is driven at full speed. It is clear that a very high average value is provided for the power level and that a greater component of high power level is present.

For this purpose, the consumption of power from the battery and from the fuel tank are determined in the present case as the basis for an evaluation based on the consumption levels in a step S7.

In order to determine the consumption (which in the case of the battery can also include recuperation and/or charging obtained with the internal consumption engine), the energy required in certain power level intervals according to the histograms must be converted into input energy that must be retrieved from the internal combustion engine or from the battery. This conversion from wheel energy to input energy results from the efficiency level at the hybrid drivetrain. However, this energy is dependent on the power level, the modes of operation, (which is to say the operating parameters), and potentially also on additional information, once it has been provided in load points. If a certain segment operating strategy is used, the usual result is that certain operation modes are activated in certain power level ranges. Therefore, this means that the predicted energy that will be required in the segment 8 according to the predicted power level is distributed to the operating modes, which are used within the context of the segment operating strategy. However, since the predicted energy is provided so that it is differentiated according to the power levels, this means that it is possible to allocate the total predicted energy for the segment 9 for respective modes of operation, which will be explained in more detail with reference to FIG. 6 through 8.

Figure 6:
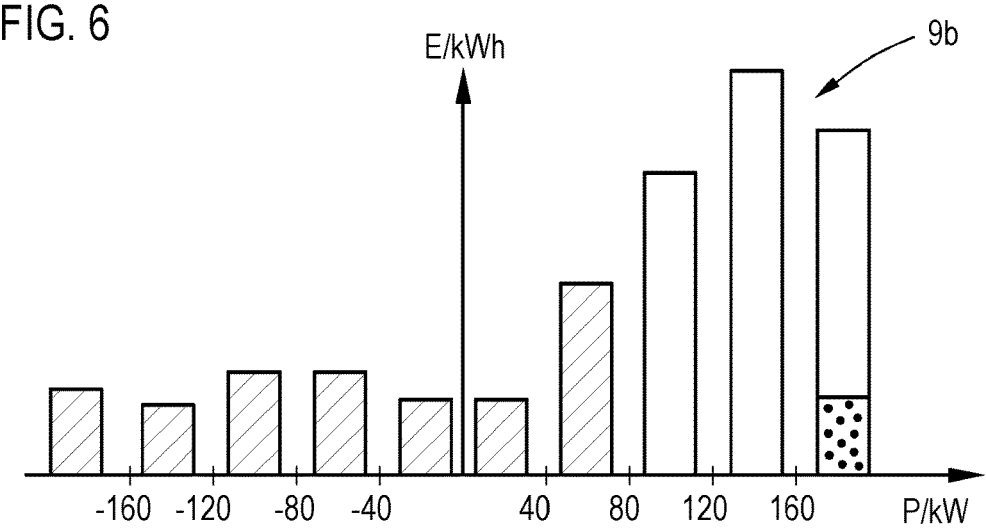

In this respect, FIG. 6 relates to an allocation of the segment operating strategy, which aims at the maximum utilization of the electromotor. This means that limits for turning the internal combustion engine on and off are set to higher values. Accordingly, the predicted energy components indicated in FIG. 6 with hatching are assigned to the operating mode at lower power levels, so that only the electromotor delivers the drive energy. Neither the predicted energy components indicated by hatching or by dots correspond in the higher power level region to an operating mode in which only the internal combustion engine is operated in order to generate energy, or to the energy components associated with the internal combustion engine. If the internal combustion engine can withstand the loads of up to 160 kW, another operating mode is provided in the high power level regions, in which the internal combustion engine is operated at the maximum power level and in addition, the drive energy is supplied with the electromotor. The drive energy component that is supplied by the electromotor is indicated by dots.

Figure 7:
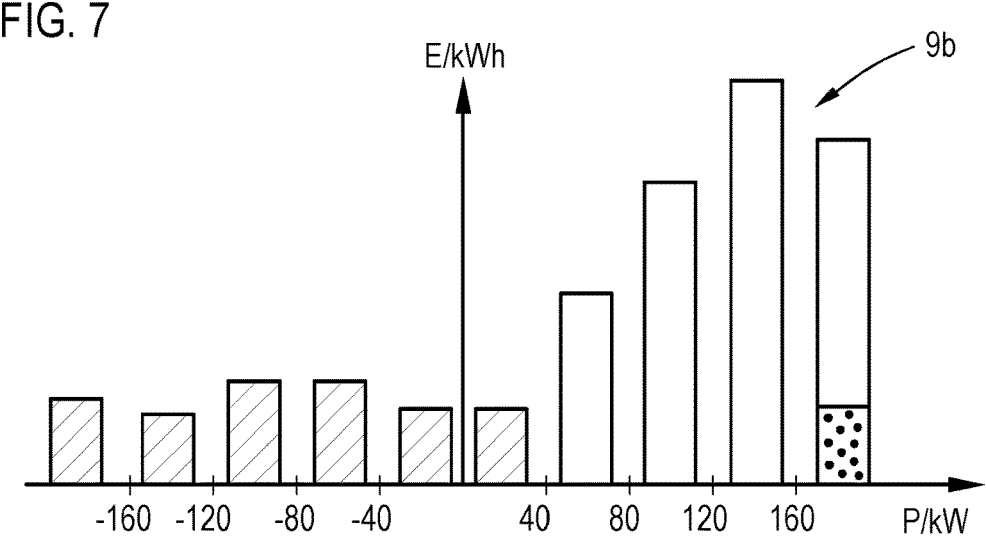

FIG. 7 shows the division of the total predicted energy of the same histogram 9b as the one shown in FIG. 6, but for another operating mode; in particular one which aims at maintaining the charging status of the battery as constant as possible. This means that the electromotor is also not fully utilized in this case, so that a smaller component is assigned at low power levels to purely electric driving (indicated by transverse hatching). A larger portion of the power level spectrum is completed by driving with the internal combustion engine, wherein the regions of the interaction of the internal combustion engine and of the electromotor (dotted area) remain equal because the corresponding power levels can no longer be achieved with the internal combustion engine alone. It is possible to design embodiments in which these power levels can be achieved with targeted, short-term overloading of the internal combustion engine, in particular when effective charging is to take place as will be described below.

Figure 8:
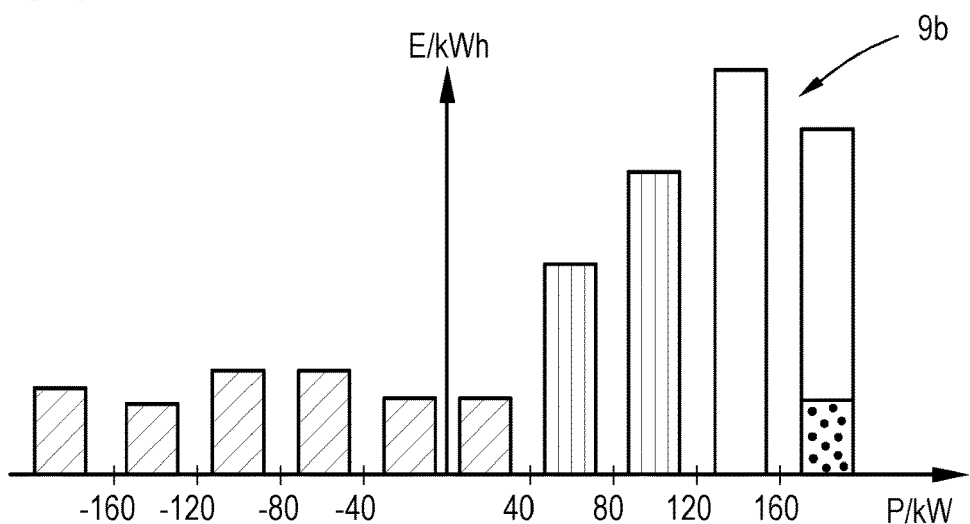

FIG. 8 relates to distribution of predicted energy relating again to the same histogram 9b as in FIGS. 6 and 7 with a third operating mode being considered, in which charging should take place as effectively as possible. The electromotor is used only at very low power levels (the regions indicated by transverse hatching), while a new operating mode is assigned to the regions of medium power levels, in which the driving pattern should be as constant as possible, wherein the battery is charged from the internal combustion engine. This operating mode is not permissible based on the operating strategies according to FIGS. 6 and 7. At higher power levels, which is to say when the dynamic of the motor vehicle should not be limited, charging is not performed, although only the internal combustion engine is used for the operation of the vehicle (the parts that are no longer marked). However, when very high power levels are required also in such an operating mode, the use of an operating mode with a simultaneous use of the internal combustion engine and of the electromotor is also possible. It also follows already from these considerations that in case of requirements for much higher power levels, the evaluation of an operating strategy for effective charging in such a segment will result mostly in lower charging levels.

Thanks to the power level intervals and the operating modes, information is now available that makes it possible to determine efficiency levels in the corresponding operating states of the hybrid drivetrain. This means that the modes of operation can now be associated with efficiency models based on the power levels and operating strategies with the predicted energy components for different power levels, which can be provided either in the form of characteristic curves or diagrams, or for example as lookup tables for all the power levels with certain operation modes, and from which the efficiency models can be read out for the power levels or power level intervals that are actually present. Moreover, it is also possible to allocate directly the energy in the predicted energy components for the power level intervals and operation modes, for which the sets of efficiency profiles are obtained for the components of the drivetrain. It is also possible to take into account additional information with this determination of the efficiency models in the drivetrain, which may also have an influence on the actual load point, for example the road type (residential area, main street, country road, highway, . . . ) and the like, which will result in an even more detailed distribution of the efficiency levels. In this case, the design can be such that the efficiency models are not provided as a fixed set of numbers for the power level interval and/or lookup tables for the different additional information items, but as characteristic curves/diagrams and/or lookup tables for different additional information; alternatively, additional information can be also entered at least partially already with the selection of the efficiency models.

Figure 9:
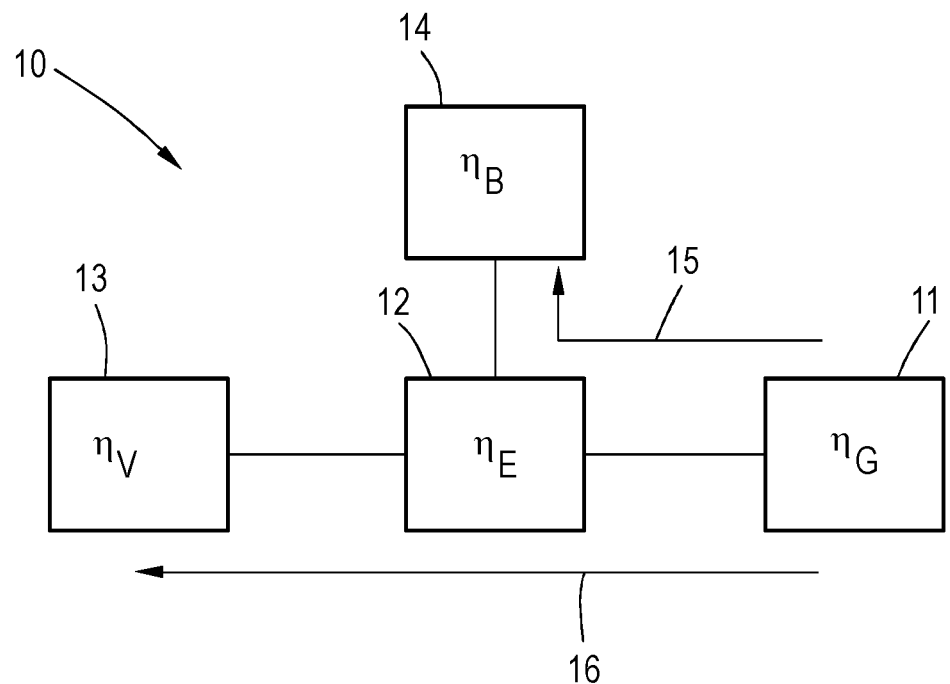

In any case, concrete values are now provided in the predicted energy components for the efficiency model that is schematically illustrated in FIG. 9 and provided with the numeral 10. The hybrid train 10 comprises a transmission 11, the electromotor 12 and the internal combustion engine 13, wherein the battery 14 supplies the electric motor 12. In the efficiency model, to each of the components 11 through 14 are assigned efficiency levels, namely to the transmission 11 is assigned an efficiency $\eta_G$, to the internal combustion motor 13 is assigned an efficiency $\eta_V$, to the electromotor is assigned an efficiency $\eta_E$, and when the battery also has been provided with an efficiency, it is assigned the efficiency $\eta_B$.

The relevant efficiency chains result in this case from the operating modes. If the motor vehicle is driven for example purely with the electromotor 12, the resulting efficiency chain, as indicated by the arrow 15, will be $\eta_G$, $\eta_E$, and $\eta_V$ according to the arrow 16.

The predicted energy component can be easily converted into the input energy with these efficiency chains. This results directly in consumption in the case of the battery 14; in the case of the internal combustion engine 13, the result will be a characteristic curve or a characteristic diagram, which illustrates the consumption of fuel in a fuel tank (not shown). In this case it is essential that in step 7, the consumption levels be determined for different possible segment operating strategies, for example the segment of the operating strategies in FIG. 6 and FIG. 8, so that they can be consequently evaluated in step S8. In an embodiment in which three operating strategies are evaluated, six consumption levels are present at the end of the step S7, namely both for electric consumption and for fuel consumption with three operating strategies.

In the evaluation in step S8, other evaluation criteria than those of step S7 can of course also be in principle included, but this will not be described in detail here.

In a step S9 it is now possible to select the most suitable segment operating strategies based on the optimization targets for the entire route 1, for example the lowest possible fuel consumption with a fully discharged battery 14 in order to reach the target location 3, or to select the best suitable segment operating strategies for the single segment 8, so that the result will be a total operating strategy that can then be also used in a step S10.

Figure 10:
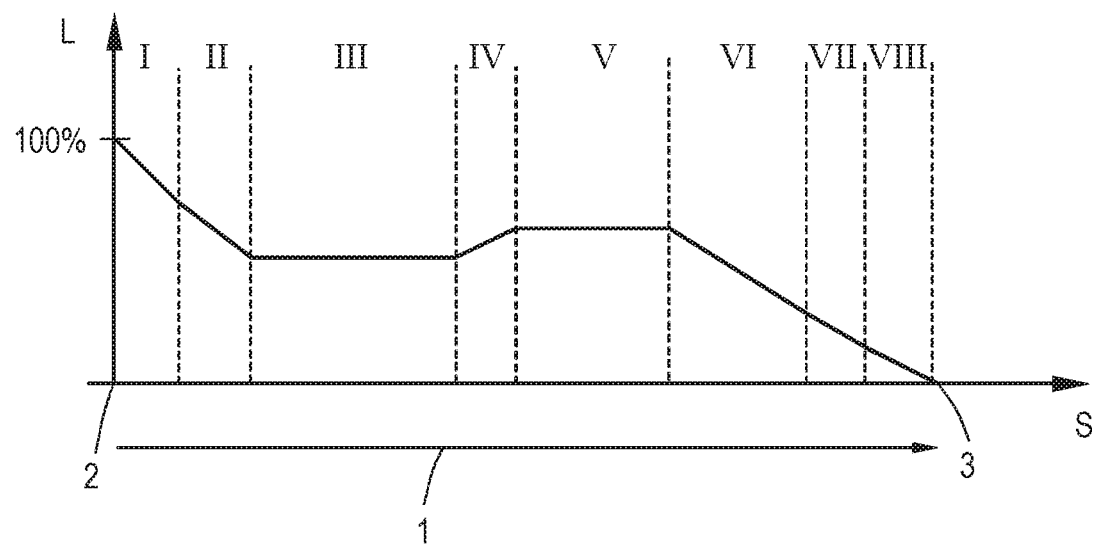

Reference is now made to FIG. 10 for explanation purposes. In this case, the present route 1 is divided into eight segments 8, wherein segment I passes through a residential area, segment II goes along a main street of location A, segment III runs through a highway without a speed limit, segment IV through a highway with a speed limit of 120 km/h, segment V through a highway with a traffic jam, segment VII through a main street in location B, and segment VIII passes through an environmental zone for which the electric driving in step S8 is judged to have an even higher value.

FIG. 10 shows a charging state curve of the battery 14 of the electromotor 12 plotted against the route 1. It can be clearly seen that in the segments I and II, "maximum electric driving" is employed with the segment operating strategy, the operations are performed in segment III with the segment operating mode "maintain the charge status", in segment IV with the operating mode "charge battery", in segment V again with the operating mode "maintain the charge status", which is used for operations again in segments VI until segment VIII up until the segment operating mode "maximum electric driving".

It should be still mentioned at this point that it may be provided that when the determination of the consumption takes into account also secondary consumption, in particular an air-conditioning device, wherein on the basis of a prediction of the secondary consumption, the energy of an air-conditioning device in particular, and the input energy required for this purpose by the internal combustion motor 13 and/or the battery 14, will be also determined, which has an immediate impact on the consumption. Separate auxiliary consumption models may be used for this purpose, which may in particular also include the efficiency levels.

Figure 11:
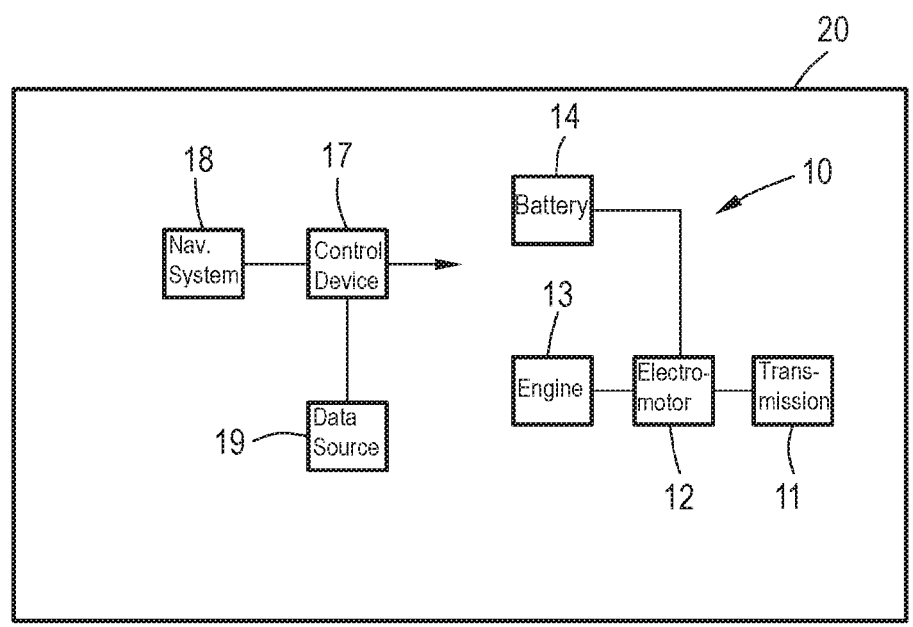

Finally, FIG. 11 shows a principle diagram of a motor vehicle 20, which in the present case is a hybrid motor vehicle. It includes the hybrid drive train 10 that was already discussed with respect to FIG. 9. In order to control the operation of the hybrid drivetrain 10, the motor vehicle 20 is provided with a control device 17, which is designed to carry out the method according to the invention, and for which purpose it is in particular connected with a navigation system 18 and with another data source 19.

The invention claimed is:

1. A method for predicting consumption of a motor vehicle comprising:
   at least one drive motor, wherein a performance levels for predicted operation of the motor vehicle, for at least one energy amount required on the wheels of the motor vehicle in order to complete a route known in advance, are determined based on base data, the base data obtained from route data comprising input data, the base data differentiated for predicted energy levels for the route;
   wherein the predicted energy levels for the route depend on at least one of:
      the assigned performance levels; and
      at least one employed strategy, in which the predicted energy levels are assigned proportionately to different efficiency models of the drive train;
   wherein efficiency models are obtained from predicted energy component efficiency models associated with one or more predicted energy components;
   wherein the efficiency models further comprise at least one of a consumption variable and a consumption-determining variable determined from an energy consumption of at least one drive motor obtained from an associated storage device;
   wherein the performance levels include, in a form of a histogram, at least one energy information required in a predetermined power level interval for the route;
   wherein the route is subdivided into route sections, each of the route sections being respectively assigned characterizing performance level information for the route section;
   wherein successive route sections are combined into a common segment when at least one item of performance level information for the route section meets a similarity criterion; and
   wherein, for each common segment, differentiated energy levels are determined based on a combination of the at least one items of performance level information that relate to the associated route sections.

2. The method according to claim 1, wherein energy consumption levels for different operating strategies applied to at least one of a same route and a same component on a route are determined, wherein the at least one employed strategy is evaluated based on the energy consumption levels for different operating strategies, and wherein a total operating strategy for the entire route is formed from the at least one employed strategy; and
   wherein the energy consumption levels for different operating strategies are further used to determine energy consumption levels for the remaining range, as differentiated for different components on the route.

3. The method according to claim 1, wherein the motor vehicle is a hybrid motor vehicle, which is operated with an electromotor supplied by a battery and with an internal combustion engine in a hybrid drivetrain;
   wherein predicted energy components are allocated to efficiency models based on different operating modes of the hybrid drivetrain at different performance levels, and the allocation of the predicted energy components to the efficiency models is carried out by using at least one operating strategy.

4. The method according to claim 3, wherein each of the operating modes comprises performing at least one of:
   a single operation of the electromotor, and a single operation of the internal combustion engine, without charging of the battery supplying the electromotor from the internal combustion engine;
   a single operation of the internal combustion engine with one charge of the battery supplying the electromotor from the internal combustion engine; and
   one maximum performance level operation of the internal combustion engine with power assistance provided by the electromotor.

5. The method according to claim 3, wherein the operating strategy comprises at least one of:
   an operating strategy that maintains the charge state of the battery supplying the electromotor;
   an operating strategy for charging the battery by a certain amount; and
   an operating strategy that can be adapted by prioritizing operating modes employed as operating strategies.

6. The method according to claim 3, wherein each of the efficiency models includes the efficiency levels of the transmission of the hybrid drivetrain, the electromotor, the internal combustion engine, and the battery; and
   wherein efficiency chains are determined and applied to a predicted energy component, the efficiency chains depending on the drive motor that is used for the determination of the required energy for a predicted energy component.

7. The method according to claim 1, wherein the predicted energy levels for at least one component of the route further depend on at least one of: a road type and traffic data describing the traffic situation, and driver data describing the driving behavior.

8. The method according to claim 1, wherein differentiated energy levels for the route known in advance are determined based on the performance levels required on the wheels of the motor vehicle, and based on a performance curve defined along the route, the performance curve comprising a plurality of segments defined along successive segments of the route.

9. The method according to claim 1, wherein the performance curve is further determined based on at least one of: driving data describing the driving behavior of the driver, and weather data and traffic data describing the traffic situation along the route.

10. The method according to claim 1, wherein the performance level information and the differentiated energy level for a segment are determined based on a predicted energy distribution, the predicted energy distribution comprising a histogram with at least two performance intervals.

11. The method according to claim 1, wherein the efficiency models further comprise a predicted energy consumption for at least one other system of the motor vehicle, the at least one other system comprising an air-conditioning device.

12. A non-transitory computer-readable storage medium comprising program code that, when executed, causes a computer to perform the step of predicting consumption of a motor vehicle comprising at least one drive motor;
wherein the performance levels for predicted operation of the motor vehicle, for at least one energy amount required on the wheels of the motor vehicle in order to complete a route known in advance, are determined based on base data, the base data obtained from route data comprising input data, the base data differentiated for predicted energy levels for the route;
wherein the predicted energy levels for the route depend on at least one of:
the assigned performance levels; and
at least one employed strategy, in which the predicted energy levels are assigned proportionately to different efficiency models of the drive train;
wherein efficiency models are obtained from predicted energy component efficiency models associated with one or more predicted energy components;
wherein the efficiency models further comprise at least one of a consumption variable and a consumption-determining variable determined from an energy consumption of at least one drive motor obtained from an associated storage device;
wherein the performance levels include, in a form of a histogram, at least one energy information required in a predetermined power level interval for the route;
wherein the route is subdivided into route sections, each of the route sections being respectively assigned characterizing performance level information for the route section;
wherein successive route sections are combined into a common segment when at least one item of performance level information for the route section meets a similarity criterion; and
wherein, for each common segment, differentiated energy levels are determined based on a combination of the at least one items of performance level information that relate to the associated route sections.

13. The non-transitory computer-readable storage medium of claim 12, further comprising program code configured to cause a computer to determine energy consumption levels for different operating strategies applied to at least one of a same route and a same component on a route, wherein the at least one employed strategy is evaluated based on the energy consumption levels for different operating strategies, and wherein a total operating strategy for the entire route is formed from the at least one employed strategy; and
wherein the energy consumption levels for different operating strategies are further used to determine energy consumption levels for the remaining range, as differentiated for different components on the route.

14. The non-transitory computer-readable storage medium of claim 12, wherein the motor vehicle is a hybrid motor vehicle, which is operated with an electromotor supplied by a battery and with an internal combustion engine in a hybrid drivetrain;
wherein predicted energy components are allocated to efficiency models based on different operating modes of the hybrid drivetrain at different performance levels, and the allocation of the predicted energy components to the efficiency models is carried out by using at least one operating strategy.

15. The non-transitory computer-readable storage medium of claim 12, further comprising program code configured to cause a computer to determine differentiated energy levels for the route known in advance, based on the performance levels required on the wheels of the motor vehicle, and based on a performance curve defined along the route, the performance curve comprising a plurality of segments defined along successive segments of the route.

16. A computer-implemented control system configured to perform the step of predicting consumption of a motor vehicle comprising at least one drive motor;
wherein the performance levels for predicted operation of the motor vehicle, for at least one energy amount required on the wheels of the motor vehicle in order to complete a route known in advance, are determined based on base data, the base data obtained from route data comprising input data, the base data differentiated for predicted energy levels for the route;
wherein the predicted energy levels for the route depend on at least one of:
the assigned performance levels; and
at least one employed strategy, in which the predicted energy levels are assigned proportionately to different efficiency models of the drive train;
wherein efficiency models are obtained from predicted energy component efficiency models associated with one or more predicted energy components;
wherein the efficiency models further comprise at least one of a consumption variable and a consumption-determining variable determined from an energy consumption of at least one drive motor obtained from an associated storage device;
wherein the performance levels include, in a form of a histogram, at least one energy information required in a predetermined power level interval for the route;
wherein the route is subdivided into route sections, each of the route sections being respectively assigned characterizing performance level information for the route section;
wherein successive route sections are combined into a common segment when at least one item of performance level information for the route section meets a similarity criterion; and wherein, for each common segment, differentiated energy levels are determined based on a combination of the at least one items of performance level information that relate to the associated route sections.

17. The computer-implemented control system of claim 16, wherein the system is further configured to determine energy consumption levels for different operating strategies applied to at least one of a same route and a same component on a route, wherein the at least one employed strategy is evaluated based on the energy consumption levels for different operating strategies, and wherein a total operating strategy for the entire route is formed from the at least one employed strategy; and wherein the energy consumption levels for different operating strategies are further used to determine energy consumption levels for the remaining range, as differentiated for different components on the route.

18. The computer-implemented control system of claim 16, wherein the motor vehicle is a hybrid motor vehicle, which is operated with an electromotor supplied by a battery and with an internal combustion engine in a hybrid drivetrain;

wherein predicted energy components are allocated to efficiency models based on different operating modes of the hybrid drivetrain at different performance levels, and the allocation of the predicted energy components to the efficiency models is carried out by using at least one operating strategy.

19. The computer-implemented control system of claim 16, wherein the system is further configured to determine differentiated energy levels for the route known in advance, based on the performance levels required on the wheels of the motor vehicle, and based on a performance curve defined along the route, the performance curve comprising a plurality of segments defined along successive segments of the route.

* * * * *